US009594594B2

(12) United States Patent
Schmit et al.

(10) Patent No.: US 9,594,594 B2
(45) Date of Patent: Mar. 14, 2017

(54) MEDIA HARDWARE RESOURCE ALLOCATION

(71) Applicant: Advanced Micro Devices, Inc., Sunnyvale, CA (US)

(72) Inventors: Michael L. Schmit, Cupertino, CA (US); Ashish Farmer, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 182 days.

(21) Appl. No.: 13/654,694

(22) Filed: Oct. 18, 2012

(65) Prior Publication Data

US 2014/0115597 A1 Apr. 24, 2014

(51) Int. Cl.
   *G06F 9/46* (2006.01)
   *G06F 15/173* (2006.01)
   *G06F 9/50* (2006.01)

(52) U.S. Cl.
   CPC ............. *G06F 9/5044* (2013.01); *G06F 9/50* (2013.01); *G06F 9/505* (2013.01); *G06F 9/5005* (2013.01); *G06F 9/5011* (2013.01); *G06F 9/5027* (2013.01); *G06F 9/5055* (2013.01)

(58) Field of Classification Search
   None
   See application file for complete search history.

(56) References Cited

U.S. PATENT DOCUMENTS

| 2004/0260811 | A1* | 12/2004 | Cherkasova | 709/225 |
| 2005/0080639 | A1* | 4/2005 | Tang | G06F 9/5044 705/7.39 |
| 2005/0261062 | A1* | 11/2005 | Lewin et al. | 463/42 |
| 2006/0026268 | A1* | 2/2006 | Sanda | 709/221 |
| 2006/0080702 | A1* | 4/2006 | Diez et al. | 725/30 |

(Continued)

FOREIGN PATENT DOCUMENTS

WO 2012067688 A1 5/2012

OTHER PUBLICATIONS

Invitation to Pay Additional Fees and Partial International Search Report for corresponding International application No. PCT/US2013/065617, dated Jan. 31, 2014, 8 pages.

*Primary Examiner* — Charles Swift
(74) *Attorney, Agent, or Firm* — Volpe and Koenig, P.C.

(57) ABSTRACT

Apparatus, computer readable medium, and method of allocating media resources, the method including determining a media resources allocation table based on one or more media hardware resources and predetermined benchmarks of media hardware resources for performing media operations; in response to receiving a request for media resources from a first application, comparing the requested media resources with the media resources allocation table; and if the comparison indicates that the requested media resources are available, then allocating the requested media resources to the first application in the media resources allocation table, and sending a response to the request for media resources to the first application indicating the requested media resources are allocated to the application. If the comparison indicates that the requested media resources are not available, then sending indicating to the first application that the requested media resources are not allocated to the first application.

11 Claims, 11 Drawing Sheets

(56) References Cited

U.S. PATENT DOCUMENTS

| | | | |
|---|---|---|---|
| 2006/0136964 A1* | 6/2006 | Diez et al. | 725/37 |
| 2006/0149652 A1* | 7/2006 | Fellenstein et al. | 705/35 |
| 2007/0255798 A1 | 11/2007 | Schneider | |
| 2007/0271358 A1* | 11/2007 | Gaddy | 709/222 |
| 2008/0281986 A1* | 11/2008 | Murakawa | G06N 3/126 709/251 |
| 2009/0006037 A1* | 1/2009 | Sankaran | H04N 19/436 702/186 |
| 2009/0080533 A1* | 3/2009 | Folta | H04N 19/159 375/240.25 |
| 2009/0178050 A1* | 7/2009 | Bichler et al. | 718/104 |
| 2009/0288092 A1* | 11/2009 | Yamaoka | G06F 9/5033 718/104 |
| 2009/0328036 A1* | 12/2009 | Betts-LaCroix | 718/1 |
| 2010/0088068 A1* | 4/2010 | Herz et al. | 702/186 |
| 2010/0312823 A1* | 12/2010 | Titus | 709/203 |
| 2011/0126056 A1* | 5/2011 | Kelleher | G06F 1/3203 714/42 |
| 2011/0154349 A1* | 6/2011 | Walton et al. | 718/104 |
| 2011/0173432 A1* | 7/2011 | Cher | G06F 17/5045 713/100 |
| 2011/0178790 A1* | 7/2011 | Golbourn et al. | 703/22 |
| 2011/0213886 A1 | 9/2011 | Kelkar et al. | |
| 2011/0235592 A1* | 9/2011 | Hoefel et al. | 370/329 |
| 2011/0258413 A1 | 10/2011 | Cho et al. | |
| 2011/0292057 A1 | 12/2011 | Schmit et al. | |
| 2013/0060837 A1* | 3/2013 | Chakraborty et al. | 709/203 |
| 2013/0275396 A1* | 10/2013 | Condict | H03M 7/607 707/693 |
| 2014/0101666 A1* | 4/2014 | Jackson | 718/104 |

\* cited by examiner

Encode Capacity Table (MBlks/sec)

304

| | power | H.264 | VC-1 | MPEG2 | MPEG-4 | ... |
|---|---|---|---|---|---|---|
| VCE 1.0 | low | 480K | 0 | 0 | 0 | |
| Shaders | high | 1.5M | 0 | 1.5M | 0 | |
| CPU | high | 240K | 300K | 450K | 420K | |
| Entropy (Mbps) | | | | | | |
| VCE 1.0 entropy | bal | 100 | 0 | 0 | 0 | |
| CPU entropy | high | 25 | 35 | 50 | 40 | |

Scaling/CSC Capacity Table

| Shaders | power | scale | CSC | VQ1 | VQ2 |
|---|---|---|---|---|---|
| | low/bal | 8M | 8M | 1M | 2M |
| CPU | high | 2M | 2M | 0 | 0 |

Audio Capacity Table

| | power | MP3 | AC-3 | DTS | Rate converter |
|---|---|---|---|---|---|
| Audio DSP | low | 5 | 15 | 20 | 5 |

FIGURE 7

MEDIA HARDWARE RESOURCE ALLOCATION

FIELD OF THE INVENTION

The present invention is generally directed to allocating media hardware resources, and in particular, to allocating media hardware resources related to graphic and audio processing.

BACKGROUND

The performance of media hardware such as graphic processing units on computing devices such as personal computers continues to improve. Media hardware used to have a difficult time smoothly decoding and playing a digital video disc (DVD) movie. Current media hardware can easily decode and play a DVD movie. However, today's computing devices enable a user to run many media applications at the same time. For example, a user may run a video teleconferencing application at the same time as playing a DVD movie. Some media applications require special performance characteristics to provide a good user experience. For example, video teleconferencing requires a low delay time to provide a good user experience. However, the video teleconferencing application may have difficulty providing a low delay time for the user if other media applications are using the media hardware.

Therefore there is a need in the art for an apparatus, computer readable medium, and method of allocating media resources.

SUMMARY OF EMBODIMENTS

An embodiment includes a method of allocating media resources including, determining a media resources allocation table based on one or more media hardware resources and predetermined benchmarks of media hardware resources for performing media operations; in response to receiving a request for media resources from a first application, comparing the requested media resources with the media resources allocation table; and if the comparison indicates that the requested media resources are available, then allocating the requested media resources to the first application in the media resources allocation table, and sending a response to the request for media resources to the first application indicating the requested media resources are allocated to the application.

The method may include, if the comparison indicates that the requested media resources are not available, then sending the response to the request for media resources to the first application indicating to the first application that the requested media resources are not allocated to the first application.

The method may include, in response to receiving a request for media resources information from the first application, sending a response indicating media resources available.

The media resources available may be determined based on one or more media hardware resources and the media resource requirements.

The method may include if the comparison indicates that a second application having a priority lower than a priority of the application is allocated media resources needed to satisfy the request for media resources, then allocating at least some of the media resources from the second application to the application in the media resources allocation table, and calling a call back routine of the second application indicating to the second application that at least some of the media resources allocated to the second application have been de-allocated, and sending a response to the request for media resources to the application indicating the requested media resources are allocated to the application.

The media resources may include at least one of a decode capacity, an encode capacity, a scaling/color space conversion (CSC) operation capacity, and an audio operation capacity.

The method may include determining the media resources allocation table based on one or more media hardware resources and predetermined benchmarks of media hardware resources for performing media operations.

The hardware media resources may include at least one of graphic card hardware resources comprising one or more graphic processing units, and one or more device central processing unit (CPU).

The method may include in response to receiving a request to initiate a media resource allocation system, generating the media resources allocation table.

An apparatus for allocating media resources is disclosed. The apparatus includes a processor configured to determine a media resources allocation table based on one or more media hardware resources and predetermined benchmarks of media hardware resources for performing media operations; the processor is further configured to respond to receiving a request for media resources from a first application by comparing the requested media resources with the media resources allocation table; and configured to allocate the requested media resources to the first application in the media resources allocation table, and to send a response to the request for media resources to the first application indicating the requested media resources are allocated to the first application, if the comparison indicates that the requested media resources are available.

The processor maybe further configured to send the response to the request for media resources to the first application indicating to the first application that the requested media resources are not allocated to the first application, if the comparison indicates that the requested media resources are not available.

The processor may be further configured to respond to receiving a request for media resources information from the application, by sending a response indicating media resources available.

The media resources available may be determined based on one or more media hardware resources and the media resource requirements.

The processor may be further configured to allocate at least some of the media resources from the second application to the application in the media resources allocation table, and call a call back routine of the second application indicating to the second application that at least some of the media resources allocated to the second application have been de-allocated, and send a response to the request for media resources to the application indicating the requested media resources are allocated to the application, if the comparison indicates that second application having a priority lower than a priority of the application is allocated media resources needed to satisfy the request for media resources.

The media resources may include at least one of a decode capacity, an encode capacity, a scaling/color space conversion (CSC) operation capacity, and an audio operation capacity.

The processor may further be configured to determine the media resources allocation table based on one or more media hardware resources and predetermined benchmarks of media hardware resources for performing media operations.

The hardware media resources may include at least one of graphic card hardware resources comprising one or more graphic processing units, and one or more device central processing unit (CPU).

The processor may further be configured to respond to receiving a request to initiate a media resource allocation system, by generating the media resources allocation table.

A computer readable non-transitory medium including instructions which when executed in a processing system cause the processing system to execute a method for allocating media resources is disclosed. The method may include the steps of: determining a media resources allocation table based on one or more media hardware resources and predetermined benchmarks of media hardware resources for performing media operations; in response to receiving a request for media resources from a first application, comparing the requested media resources with the media resources allocation table; and if the comparison indicates that the requested media resources are available, then allocating the requested media resources to the first application in the media resources allocation table, and sending a response to the request for media resources to the first application indicating the requested media resources are allocated to the application.

BRIEF DESCRIPTION OF THE DRAWINGS

A more detailed understanding may be had from the following description, given by way of example in conjunction with the accompanying drawings wherein:

FIG. 5 is a diagram of an example of an encode capacity table;

FIG. 6 is a diagram of an example of a scaling/color space conversion (CSC) capacity table;

FIG. 7 is a diagram of an example of an audio capacity table;

DETAILED DESCRIPTION OF EMBODIMENT(S)

Embodiments of an apparatus, computer readable medium, and method of allocating media resources are disclosed where media resources are allocated using a media resources table (e.g. records).

Figure 1:
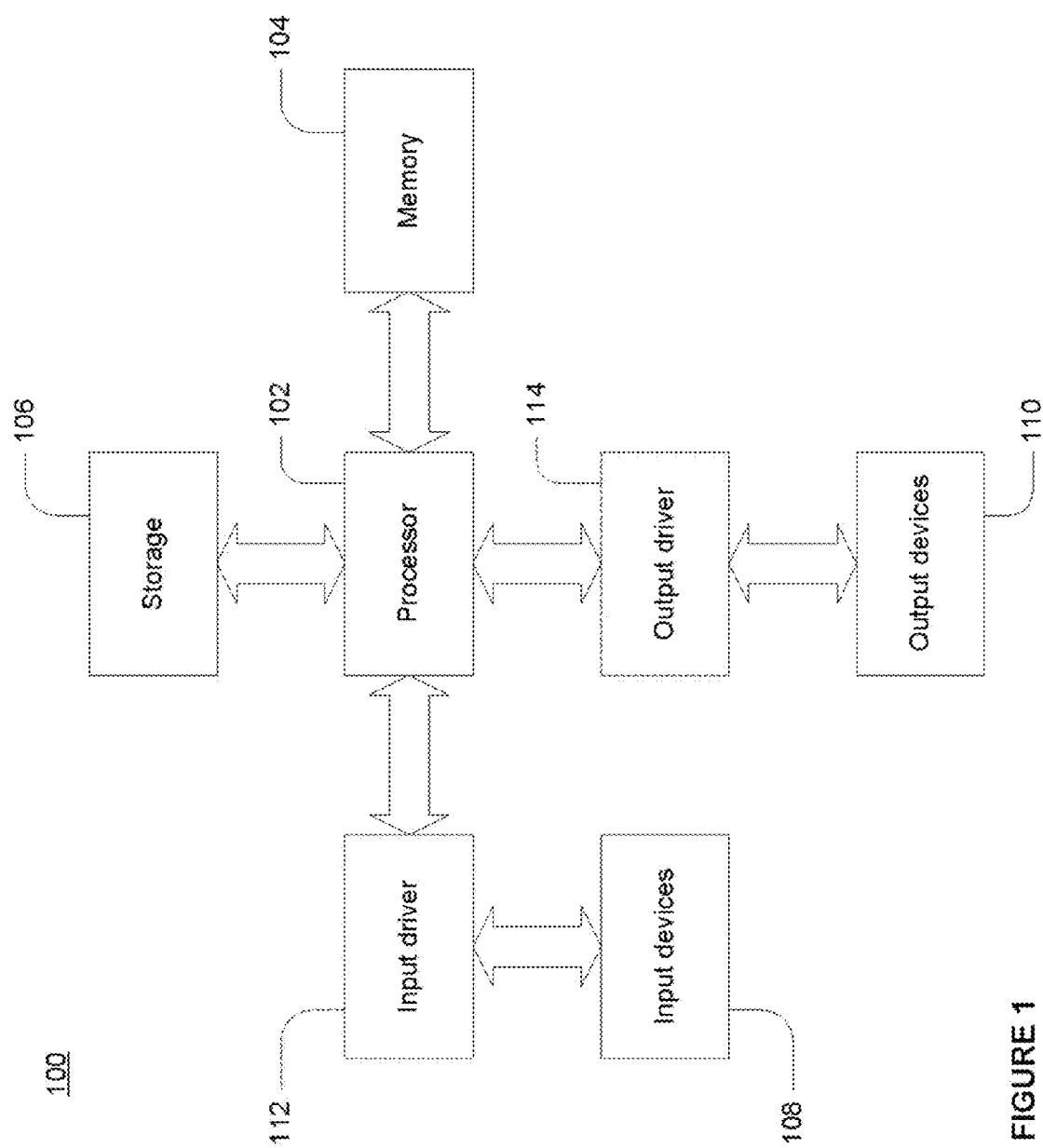
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
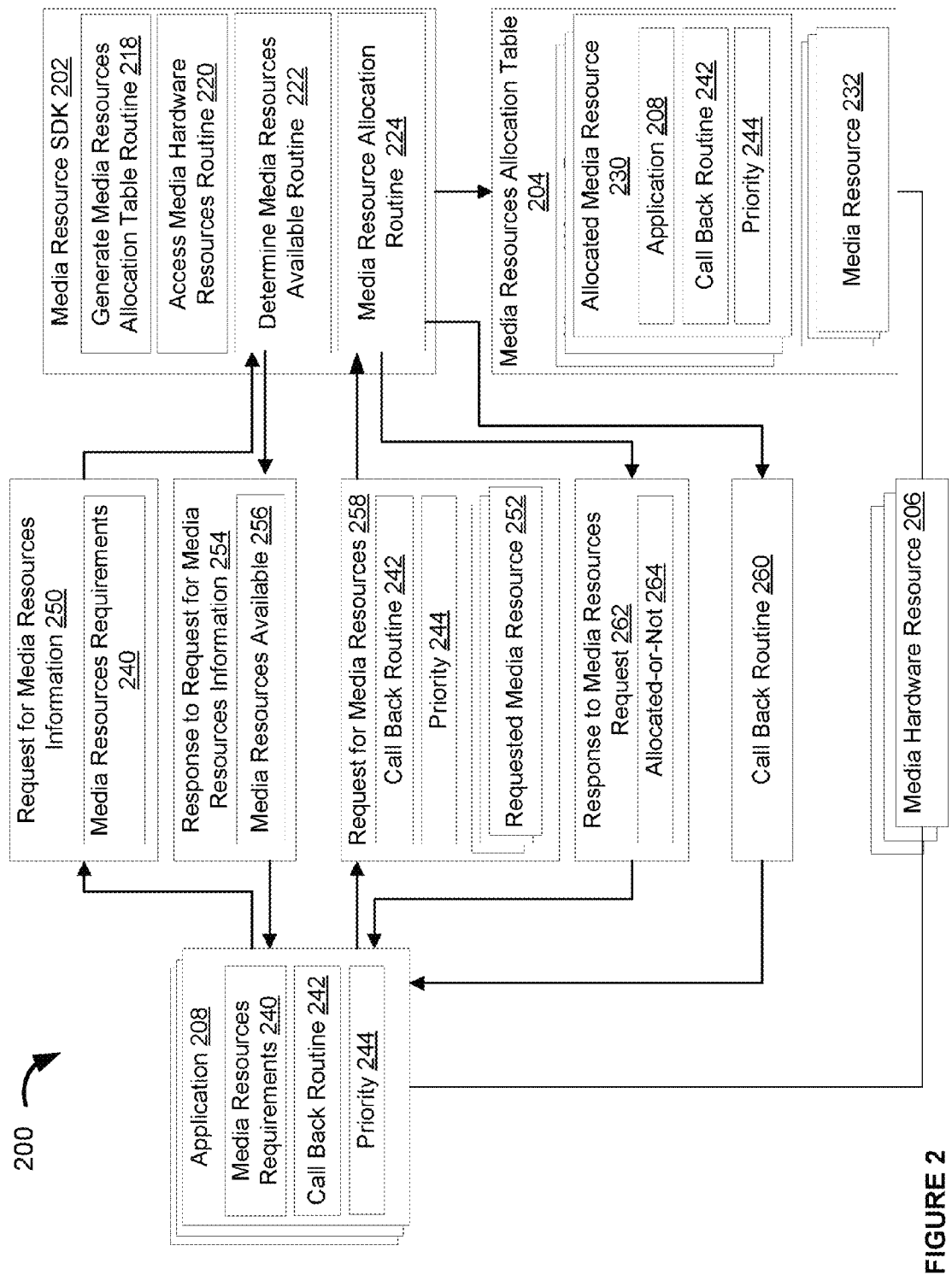
FIG. 2 a block diagram of an example of a system for media resource allocation.

FIG. 2 a block diagram of an example of a system for media resource allocation 200. The system 200 includes media resource software development kit (SDK) 202, media resources allocation table 204, media hardware resource 206, application 208, and interaction between the application 208 and the media resource SDK 202, in which the interaction includes request for media resources information 250, response to request for media resources information 254, request for media resources 258, response to request for media resources 262, and call back routine 260. The application 208 may optionally send a request for media resources information 250 to the media resource SDK 202 with media resources requirements 240.

The media resource SDK 202 responds with a response to request for media resources information 254 with a media resources available 256, which indicates media resources 232 the application 208 may request. The application 208 then sends a request for media resources 258 that includes requested media resources 252 to the media resource SDK 202, which responds by sending a response to media resources request 262 that includes allocated-or-not 264 which indicates whether or not the requested media resources 252 were allocated to the application 208 or not.

If the application 208 is allocated the requested media resources 252, then the application 208 may then use the requested media resources 252. The media resource SDK 202 allocates and de-allocates media resources 232 using the media resources allocation table 204. As will be appreciated, media resources allocation table 204 may not only be in tabular form, but may also be in any form of record which indicates the media resources 232 may be considered a "table".

The media hardware resources 206 are resources of the device 100 (see FIG. 1) that may be used for media applications by the first application 208. The following are examples of media hardware resources: central processing units (CPUs), graphic processing units (GPUs), shaders, memory, television input and output ports, and multi-monitor use ports.

The media resource SDK 202 may be a software development kit that includes generate media resources allocation table routine 218, access media hardware resources routine 220, determine media resources available routine 222, and media resource allocation routine 224. The generate media resources allocation table routine 218 may be a routine to generate the media resources allocation table 204 based on the media hardware resources 206 and predetermined media resource capacities for the media hardware resources 206. The access media hardware resources routine 220 may be one or more routines that enable the application 208 to access media hardware resources 206. For example, access media hardware resources routine 220 may include a routine for the application 208 to access a graphics processing unit (GPU) located on a graphics card. The determine media resources available routine 222 may be a routine that, in response to receiving a request for media resources information 250 from the application 208, sends a response to request for media resources 254 that includes media resources available 256, which may be media resources 232 that are appropriate for the application 208 based on the media resources requirements 240 of the application 208. The media resource allocation routine 224 is a routine that allocates and de-allocates media resources 232. The media resource allocation routine 224 responds to a request for media resources 258 by the application 208 with a response to media resources request 262 that includes allocated-or-not 264, which indicates whether or not the requested media resources 252 were allocated to the application 208 or not. In embodiments, allocated-or-not 264 includes additional information such as suggestions for different media resources 232 other than those in the requested media resources 252. Media resource allocation routine 224 may use a call back routine 260 to de-allocate or release from the application 208 allocated media resources 230.

The media resource allocation routine 224 may allocate to applications 208 and de-allocate media resources 232 from applications 208 in a media resources allocation table 204. The media resources allocation table 204 may include media resources 232 and allocated media resource 230. The media resources 232 may include tables indicating the capacity of the media hardware resources 206 to perform certain media operations such as coding, decoding, scaling, color space conversion (CSC), and audio processing. The allocated media resources 230 may include application 208, call back routine 242, and priority 244. The allocated media resource 230 is a media resource 232 that is allocated to an application 208 with a priority 244 and call back routine 242. The media resources 232 may be determined based on the media hardware resources 206 and pre-determined benchmarks. Media resources 232 are discussed further below.

The application 208 may be an application that uses media hardware resources 206. The application 208 may have media resource requirements 240, a call back routine 242, and priority 244. Examples of an application 208 are an application 208 to playback a DVD or high definition movie, an application for video conferencing, a video game, a remote display application, and an application for video transcoding, which is an application that converts video from one format to another format.

Media resources requirements 240 may be media resources requirements 240 that the application 208 may need to perform its function. Examples of media resource requirements 240 are a codec and resolution in megabytes and an amount of encoding and decoding that the application 208 will need to perform to deliver performance goals. The media resource requirements 240 may include other information such as whether or not the application 208 can use multiple GPUs and whether or not the application 208 is a real-time application or background application 208. The determine media resources available routine 222 may determine what to include in the media resources available 256 based on the information provided in the media resources requirements 240. Media resource requirements 240 are discussed further below.

A call back routine 242 is a routine that enables the media resource allocation routine 224 to notify the application 208 that at least some of the allocated media resources 230 for the application 208 have been de-allocated. For example, the media resource allocation routine 224 may notify a background transcoder application 208 that the allocated media resources 230 have been de-allocated, and that the transcoder application 208 will need to request new media resources 232 or wait for media resources 230 to be released or de-allocated by another (second) application 208. The application 208 may send to the media resource SDK 202 some way for the media resource allocation routine 224 to call the call back routine 242, which may be, for example, a pointer to a routine in the programming language C.

A priority 244 is a priority that the media resource allocation routine 224 may use to allocate and de-allocate media resources 232. For example, a transcoder application 208 that is translating a movie from one format to a second format in the background may have a low priority 244, while a real time video conferencing application 208 may have a high priority 244. In embodiments, the application 208 may determine the priority 244 based on information included in media resources available 256. The media resource allocation routine 224 may use the priority 244 to determine to de-allocate media resources 232 from the transcoder application 208 to the real time video conferencing application 208. The priority 244 may be represented by a number.

In operation, the application 208 may optionally send a request for media resources information 250 that includes media resources requirements 240. Determine media resource requirements available routine 222 then determines how to respond to the request for media resources information 250 based on the media resources 232 and the media resources requirements 240. Determine media resource requirements routine 222 is discussed further below.

The application 208 then sends a request for media resources 258 to the media resource allocation routine 224. The request for media resources 258 may include call back routine 242, priority 244, and requested media resources 252. In embodiments, the application 208 determines the requested media resources 252 based on the media resources available 256 received from the determine media resources available routine 222 and the media resource requirements 240. In embodiments, the application 208 may determine the requested media resources 252 differently. For example, the application 208 may access the media resources 232 directly from the media resources allocation table 204 and determine the requested media resources 252 based on the media resources 232 and the media resources requirements 240.

The media resources allocation routine 224 determines whether or not the requested media resources 252 should be allocated to the application 208 based on the media resources allocation table 204 and the request for media resources 258. The media resource allocation routine 224 may determine that another or second application 208 with a lower priority 244 than the first application 208 should have its media resources 232 de-allocated to meet the request for media resources 258 from the first application 208. In this case, the media resource allocation routine 224, calls the call back routine 242 of the second application 208 with a lower priority 244 to notify the second application 208 that at least some of its allocated media resources 232 have been de-allocated. The media resource allocation routine 224 then allocates the media resources 232 for the first application 208 with the higher priority 244, and then sends a response to media resources request 262 indicating that the requested media resources 252 have been allocated, which may be represented by allocated-or-not 264. The second application 208 that had some of its media resources 232 de-allocated could send a new request for media resource 258. In embodiments, the media resource allocation routine 224 allocates a different set of media resources 232 to the first application 208, then in the requested media resources 252, and sends the different media resources 232 allocated to the first application 208 in the response to media resources request 262. In embodiments, the response to media resources request 262 includes suggested alternative media resources 232 that the first application 208 may use to meet the media resource requirements 240.

Figure 3:
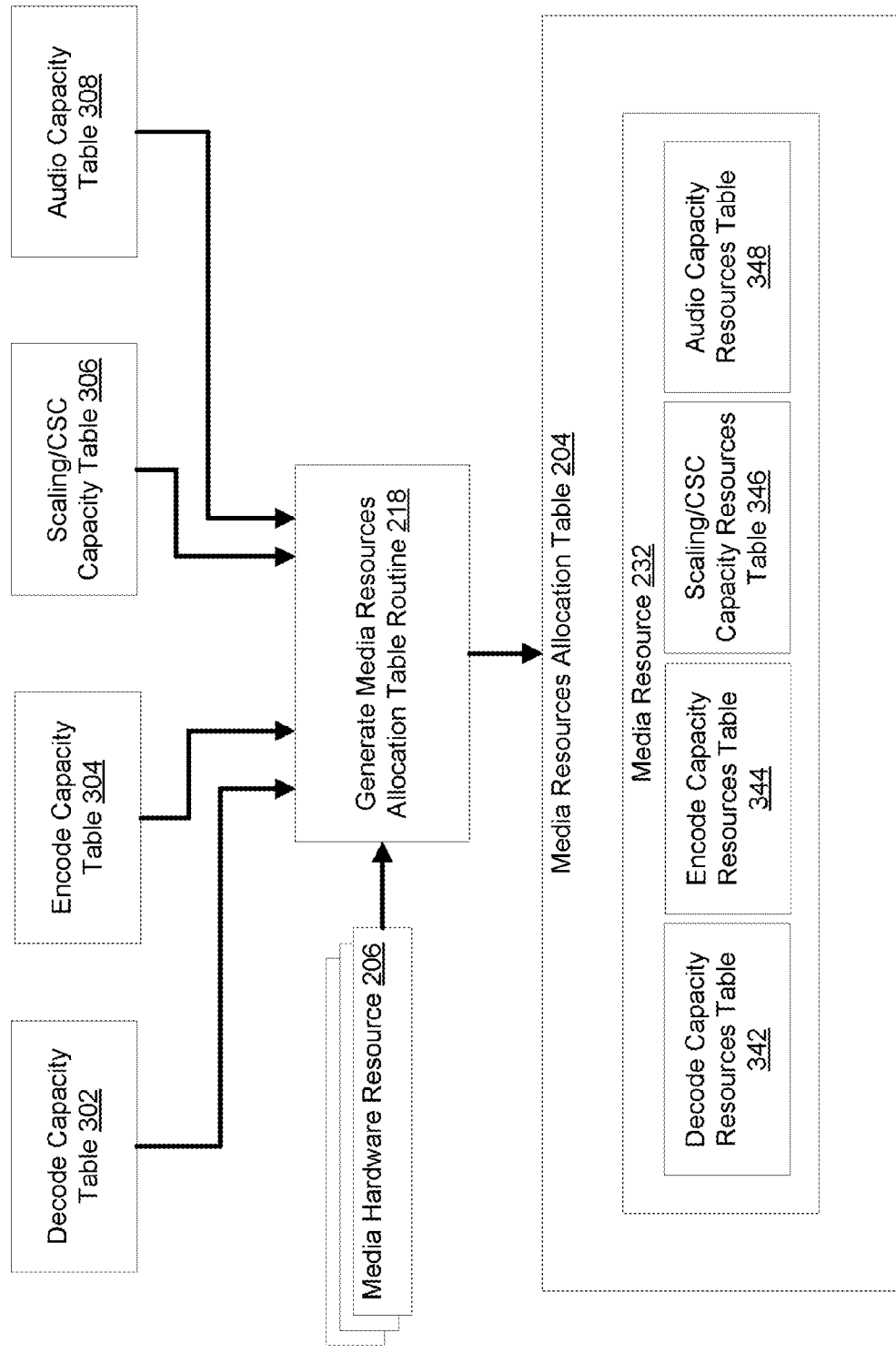
FIG. 3 is a block diagram of an example of generating a media resources allocation table.

FIG. 3 is a block diagram of an example of generating a media resources allocation table 204. Illustrated in FIG. 3 are decode capacity table 302 (see FIG. 4), encode capacity table 304 (see FIG. 5), scaling CSC/capacity table 306 (see FIG. 6), audio capacity table 308 (see FIG. 7), media hardware resources 206, generate media resources allocation table routine 218, and media resources allocation table 204, which includes media resources 232, which may include decode capacity resources table 342, encode capacity resources table 344, scaling/CSC capacity resources table 346, and audio capacity resources table 348. The generate media resources allocation table routine 218 generates the media resources allocation table 204 including the media resources 232 based on the capacity tables 302, 304, 306, 308, and the media hardware resources 206.

Figure 4:
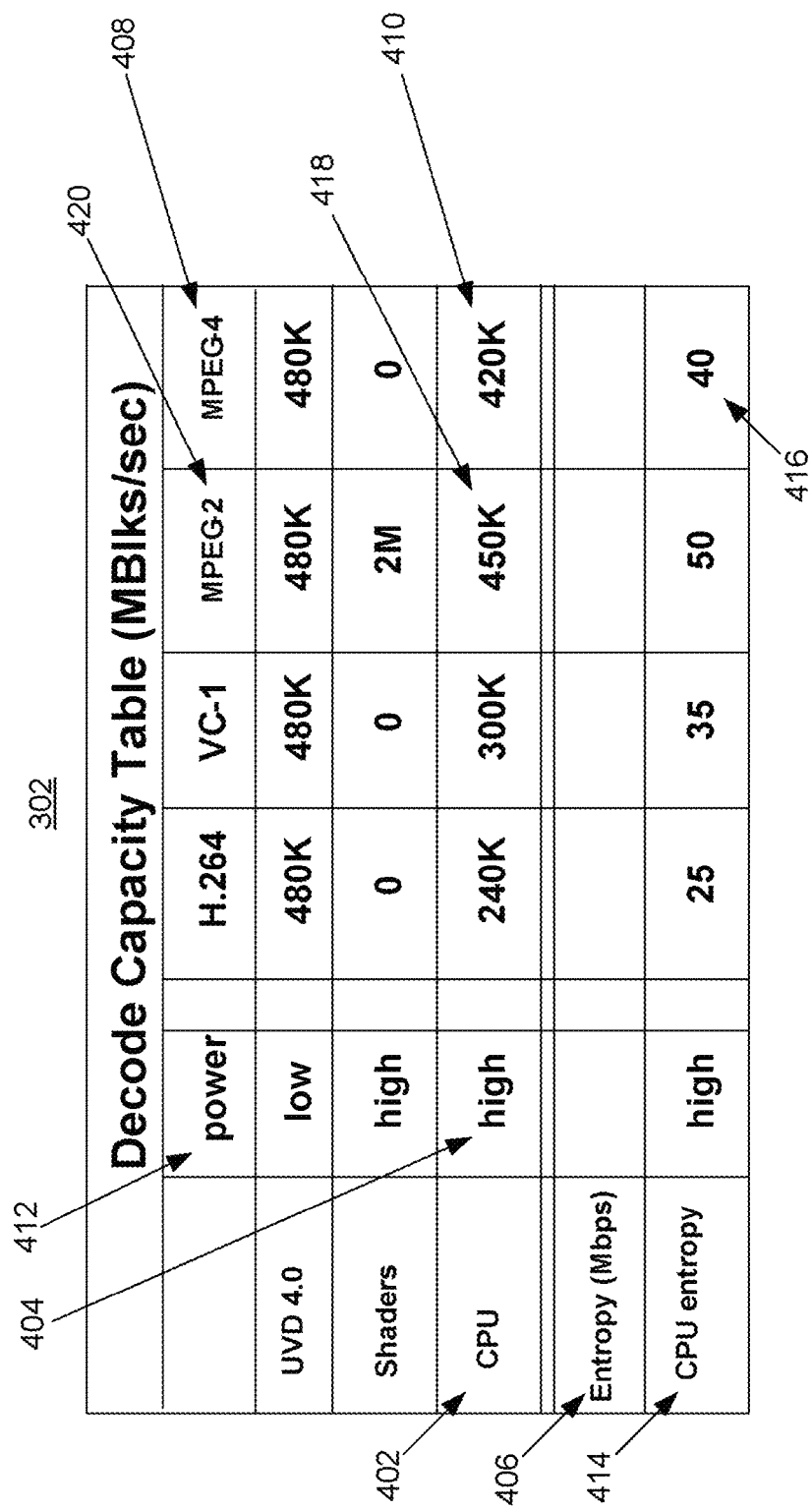
FIG. 4 is a diagram of an example of a decode capacity table.

Refer to FIGS. 2-7 for the following example of how a media resource 232 may be generated by the generate media resources allocation table routine 218. FIG. 4 is a diagram of an example of a decode capacity table 302. The rows indicate media hardware resources 206. For example, a CPU 402 is a media hardware resource 206. The columns indicate the media resource 232 and an estimated capacity of the media hardware resource 206 to provide the media resource 232. The estimated capacity of the media resource 232 provided by the media hardware resource 206 is only an estimate and, in embodiments, is intentionally underestimated to lower the risk of poor device 100 or application 208 performance. For example, a CPU 402, which is a media hardware resource 206, has an estimated capacity of 420K Macro blocks per second (MBlks/sec) 410 for decoding MPEG-4 408, which is a media resource 232 and an estimated capacity of 450K MBlks/second 418 for decoding MPEG-2 420, which is another media resource 232. The media hardware resources 206 may indicate that the device 100 (see FIG. 1) has one CPU 402. The generate media resources allocation table 218 generates a media resource 232 for the CPU 402 indicating that the CPU 402 provides a capacity of 420K MBlks/sec 410 for MPEG-4 408, 450K MBlks/sec 418 for MPEG-2, 300K MBlks/sec for VC-1, 240K MBlks/sec for H.264, and that the CPU entropy encoding 414 provides 40 MBlks/sec 416 for MPEG-4 408. The generate media resources allocation table 218 may generate, as part of the media resources 232, an indication that the CPU 402 requires high 404 power 412. The generate media resources allocation table 218 may generate an decode capacity resources table 342 from the media resources allocation table 204 by, for example, determining the media hardware resources 206 on the device 100 and using the decode capacity table 302 for determining the decode capacity resources table 302 for the device 100. For example, if there were 4 CPUs 402 on the device 100, then the numbers in the row for CPU 402 would be multiplied by 4. For example, 420K (410)*4=1,680K.

Adjustments to the media resources 232 generated including values in the decode capacity resources table 342, encode capacity resources table 344, scaling/CSC capacity resources table 346, and audio capacity resources table 348, may be made based on actual determinations of a clock speed of the device 100 compared with an estimated clock speed of the device 100. In embodiments, routines may be provided to provide actual performance measurements to adjust the generated media resources 232. For example, a routine may be provided that tests the encode rate of a GPU or CPU, or to measure the performance of an actual memory or shader.

In an embodiment, the generate media resources allocation table 218 builds a linked list or other structure as the media resources 232 are generated.

The media resource allocation routine 224 may manage the media hardware resource 206, by reducing the media resources 232 provided by the CPU 402 when, for example, a percentage of the CPU 402 is allocated by a media resource 232. For example, if 210K MBlks/sec were allocated to an application 208, the media resource allocation routine 224 may reduce all of the media resources 232 provided by the CPU 402 by one half, since half of the CPU 402 was allocated by the media resource of 210K MBlks/sec out of 420K MBlks/sec 410. This example assumes there is only one CPU 402 on the device 100. So, for example, media resource allocation routine 224 may reduce 450K MBlks 418 to 225K MBlks, since half of the CPU 402 is allocated.

In a similar fashion, table 304 (FIG. 5) may be used by the generate media resources allocation table 204 to generate media resources 232 for decoding, which may include encode capacity resources table 344, table 306 (FIG. 6) may be used to generate media resources 232 for scaling/CSC, which may include scaling/CSC capacity resources table 346, and table 308 (FIG. 7) may be used to generate media resources 232 for audio processing, which may include audio capacity resources table 348.

Thus, the generate media resources 232 may generate the media resources 232 and the media resources allocation table 204 from the decode capacity table 302, the encode capacity table 304, the scaling/CSC capacity table 306, the audio capacity table 308, and the media hardware resources 206.

Figure 8:
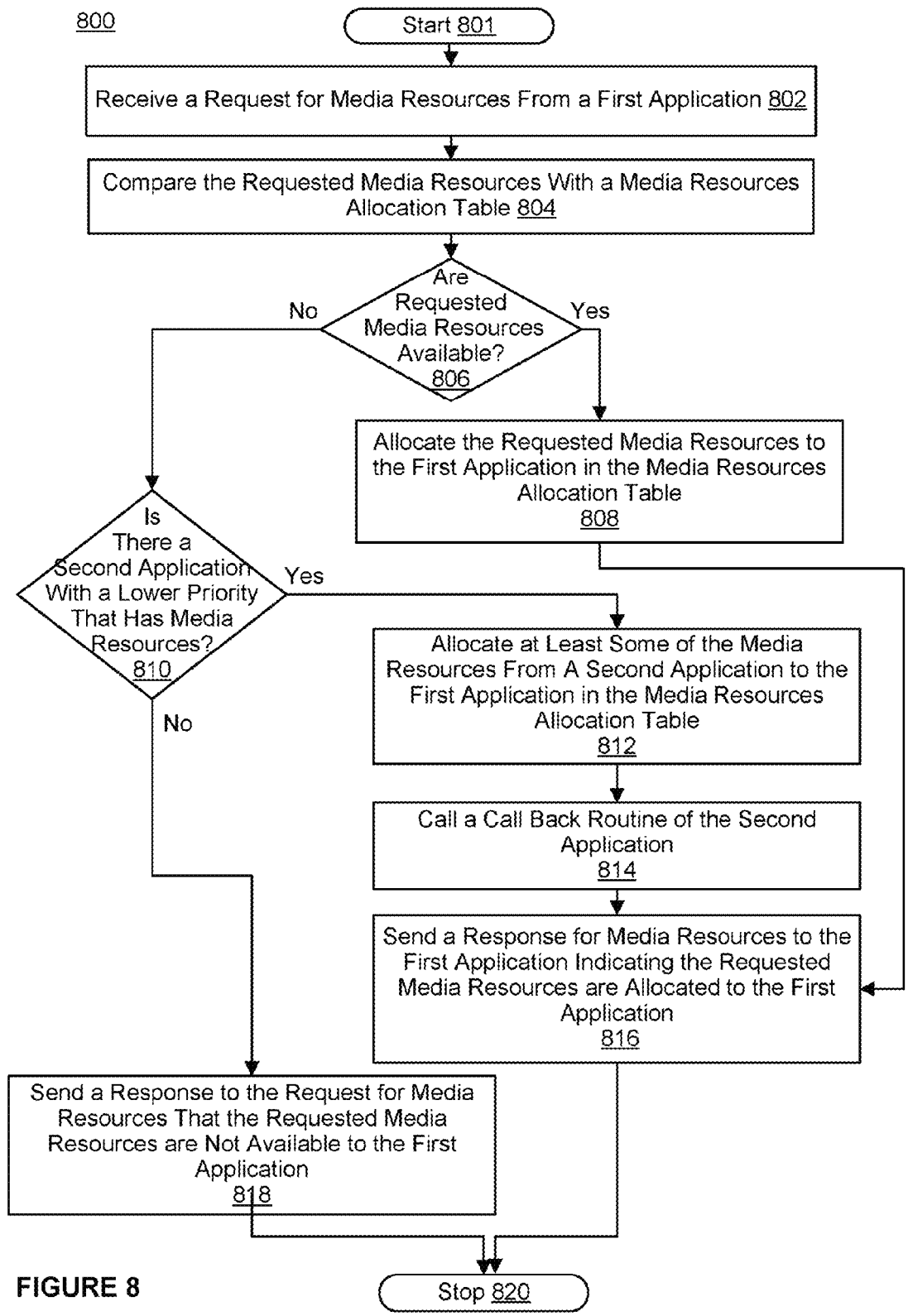
FIG. 8 is a block diagram of an example of a method of allocating media resources.

FIG. 8 is a block diagram of an example of a method of allocating media resources. The method 800 begins with start (801). The method 800 continues with receive a request for media resources from a first application (802). For example, referring to FIG. 2, the media resource SDK 202 may receive a request for media resources 258 from a first application 208. The method 800 continues with compare the requested media resources with a media resources allocation table (804). For example, the media resource SDK 202 may compare the requested media resources 252 with media resources 232 and allocated media resources 230 in the media resources allocation table 204. The method 800 continues with are requested media resources available (806). For example, the media resource SDK 202 may determine whether or not the requested media resources 252 are available in the media resource allocation table 204. If the requested media resources 252 are available, then the method 800 continues with allocate the requested media resources to the first application in the media resources allocation table (808). For example, the media resource SDK 202 may place allocated media resource 230 in the media resource allocation table 204 to indicate that the requested media resources 252 are allocated to the first application 208 having a call back routine of call back routine 242 and a priority of priority of 244. The method 800 continues with send a response for media resources to the first application indicating the requested media resources are allocated to the application (816). For example, continuing to refer to FIG. 2, the media resource SDK 202 may send to application 208 a response to media resources request 262 with an allocated-or-not 264 that indicates that the requested media resources 252 have been allocated to the application 208. The method 800 continues with stop 820.

If the requested media resources are not available at (806), then the method 800 continues with determine whether there is a second application with a lower priority that has media resources (810). For example, the media resource SDK 202 may examine the media resource allocation table 204 and determine whether or not one or more applications 208 has allocated media resources 230 with a lower priority 244 than the priority 244 of the first application 208 that made the request for media resources 258. If a second application 208 with a lower priority 244 does have allocated media resources 230, then the media resource SDK 202 determines whether or not de-allocating those allocated media resource 258 would be sufficient to enable the media resource SDK 202 to satisfy the request for media resources 258 made by the first application 208 with the higher priority.

If the media resources 230 cannot be de-allocated from a lower priority second application 208 to satisfy the request for media resources 258, then the method 800 continues with sending a response to the request for media resources that the requested media resources are not available to the first application (818). For example, the media resource SDK 202 may send a response to media resources request 262 with an allocated-or-not 264 indicating that the requested media resources 252 were not allocated. In embodiments, allocated-or-not 264 indicates additional information regarding what media resources 230 are available to assist the application 208 in making another request for media resources 258.

If the media resources 230 can be de-allocated or released from lower priority applications 208 to satisfy the request for media resources 258, then the method 800 continues with allocating at least some of the media resources from a second application to the application in the media resources allocation table (812). For example, allocated media resources 230, which are allocated to a second application 208 with a lower priority 244 may be de-allocated, and then allocated to the first application 208. Other media resources 232 may also be allocated to the first application 208 to meet the request for media resources 258. In embodiments, only some of the allocated media resources 230 of the second application 208 with the lower priority 244 are de-allocated. The second application 208 may continue to have some allocated media resources 230, which may enable the second application 208 with lower priority 244 to continue to run. The method 800 continues with call a call back routine of the second application 208 with the lower priority 244 (814). For example, the media resource SDK 202 may call "call back routine" 260 of the second application 208 with the lower priority 244. The call to the call back routine 260 may include an indication of which allocated media resources 230 were de-allocated, and may include information regarding which additional media resources 232 are not allocated to assist the second application 208 with a lower priority 244 in making another request for media resources 258. The method 800 may continue to (816) as described above with the method 800 then continuing to stop (820.) In embodiments, the method steps 812, 814, and 816 may be performed in any order. In embodiments, media resources 232 may be de-allocated from more the one second application 208 so that steps 812 and 814 may be performed for each of the applications 208 that have media resources 232 de-allocated.

In embodiments, the method may continue with the first application 208 sending an indication to the media resource SDK 202 that the requested media resources 252 should no longer be allocated to the application 208. The media resource SDK 202 may then remove the allocated media resource 230 entry from the media resource allocation table 204, which would enable the media resource SDK 202 to allocate the previously allocated media resources 230 to the second application 208.

In an embodiment, the determine media resources available routine 222 takes the requested media resources 252 and matches them with media resources 232 in the decode capacity resources table 342, encode capacity resources table 344, scaling/CSC capacity resources table 346, and audio capacity resources table 348. If a requested media resource 252 can be met, then the allocated media resources 232 are subtracted from the media resources 232 which may be decode capacity resources table 342, encode capacity resources table 344, scaling/CSC capacity resources table 346, and audio capacity resources table 348. The matching performed by determine media resources available routine 232 may be based on preferences such as low power, where low power media resources 232 would be allocated, if possible, before higher power media resources. In embodiments, method 800 may include determining a media resources allocation table based on one or more media hardware resources and predetermined benchmarks of media hardware resources for performing media operations. For example, referring to FIG. 2, the application 208 may call generate media resources allocation table routine 218 to initial media resources. In embodiments, 810 is optional. In embodiments, 810, 812, 814, and 818 are optional.

Figure 9:
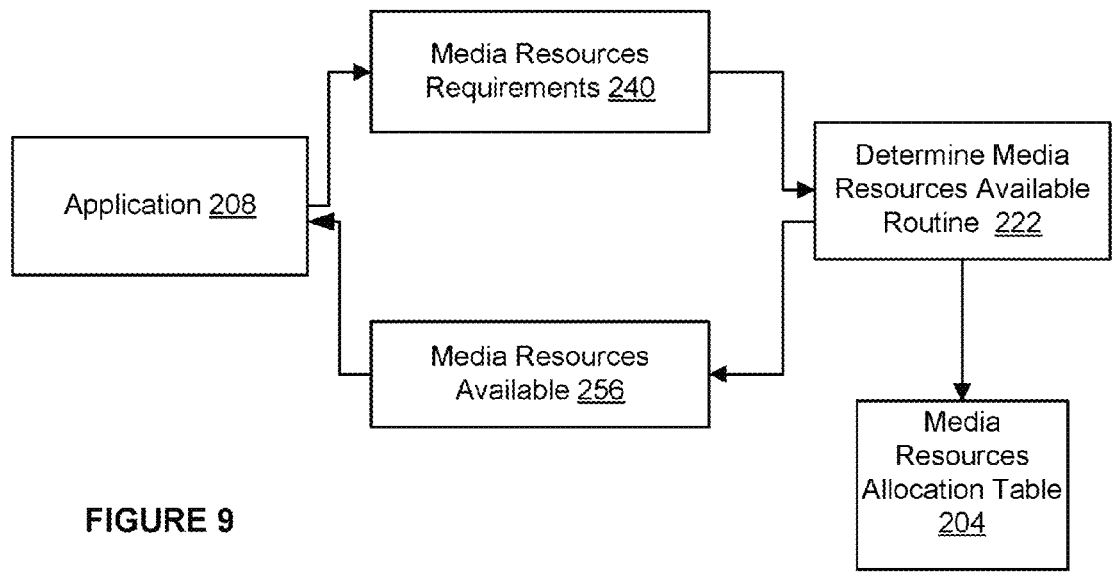
FIG. 9 is a block diagram of an example of an application sending media resources requirements to the media resources SDK and receiving media resources available from the media resources SDK.

FIG. 9 is a block diagram of an example of an application 208 sending media resources requirements 240 to the media resources SDK and receiving media resources available 256 from the media resources SDK. For example, an application 208 may send media resource requirements 240 to determine media resources available routine 222 of the media resource SDK 202. The determine media resources available routine 222 may generate the media resources available 256 based on the media resources requirements 240 and the media resources allocation table 204.

In an embodiment, the media resource requirements 240 may include an application class, which may be used as the priority 244. The application class may have the following values: "0" indicating a default; "1" indicating a wireless display application; "2" indicating a video conferencing or audio (real time plus low latency) application; "3" indicating a real time (playback, streaming, video editing preview, etc) application; "4" reserved; "5" indicating a background transcode application with a high priority; 6: a background transcode applications with a low priority; 7: reserved.

In an embodiment, the media resource requirements 240 may include information regarding codecs for decode and encode. The codecs may include the codec standard, a desired resolution and frame rate, whether or not it is interlaced and/or progressive, and a maximum bit rate that may be used. The determine media resources available routine 222 may use this information to provide suggestions for media resources 232 for the application 208 to use.

In an embodiment, the media resource requirements 240 may include an encode/decode mode, which may be represented by 4 bits for the encode and the decode. Examples of possible values for encode/decode are "0" indicating that defaults should be used based on other requirements; "1" indicating that fixed function hardware (UVD or VCE) should be used; "2" indicating that CPU software will be used; "4" indicating that GPU shaders should be used; and, "8" indicating a hybrid among the other should be used. The determine media resources available routine 222 may use this information to provide suggestions for media resources 232 for the application 208 to use.

In an embodiment, the media resource requirements 240 may include power-performance tradeoff information. The power-performance tradeoff information may be represented as follows: "0" indicating the applications does not care; "1" indicating the application wants to use low power; "2" indicating the application wants to use high performance; "3" indicating the application wants a balance between low and high power. The determine media resources available routine 222 may use this information to provide suggestions for media resources 232 for the application 208 to use.

In an embodiment, the media resource requirements 240 may include performance-quality tradeoff information. The performance-quality tradeoff information may indicate that the application requests media resources that meet one of the following descriptions of performance-quality tradeoff: do not care, fastest performance, high quality, and balance between fastest performance and high quality. The determine media resources available routine 222 may use this information to provide suggestions for media resources 232 for the application 208 to use.

In an embodiment, the media resource requirements 240 may include information regarding GPU usage. For example, the following values may be used to designate different requirements or requests for GPU usage: 0 indicating automatic selection of GPUs is acceptable; 1 indicating use on-die GPUs only; a 2 indicating use discrete GPUs only; 3 indicating use both types of GPUs; and, 4 indicating that all operations should use one GPU. The determine media resources available routine 222 may use this information to provide suggestions for media resources 232 for the application 208 to use.

Figure 10:
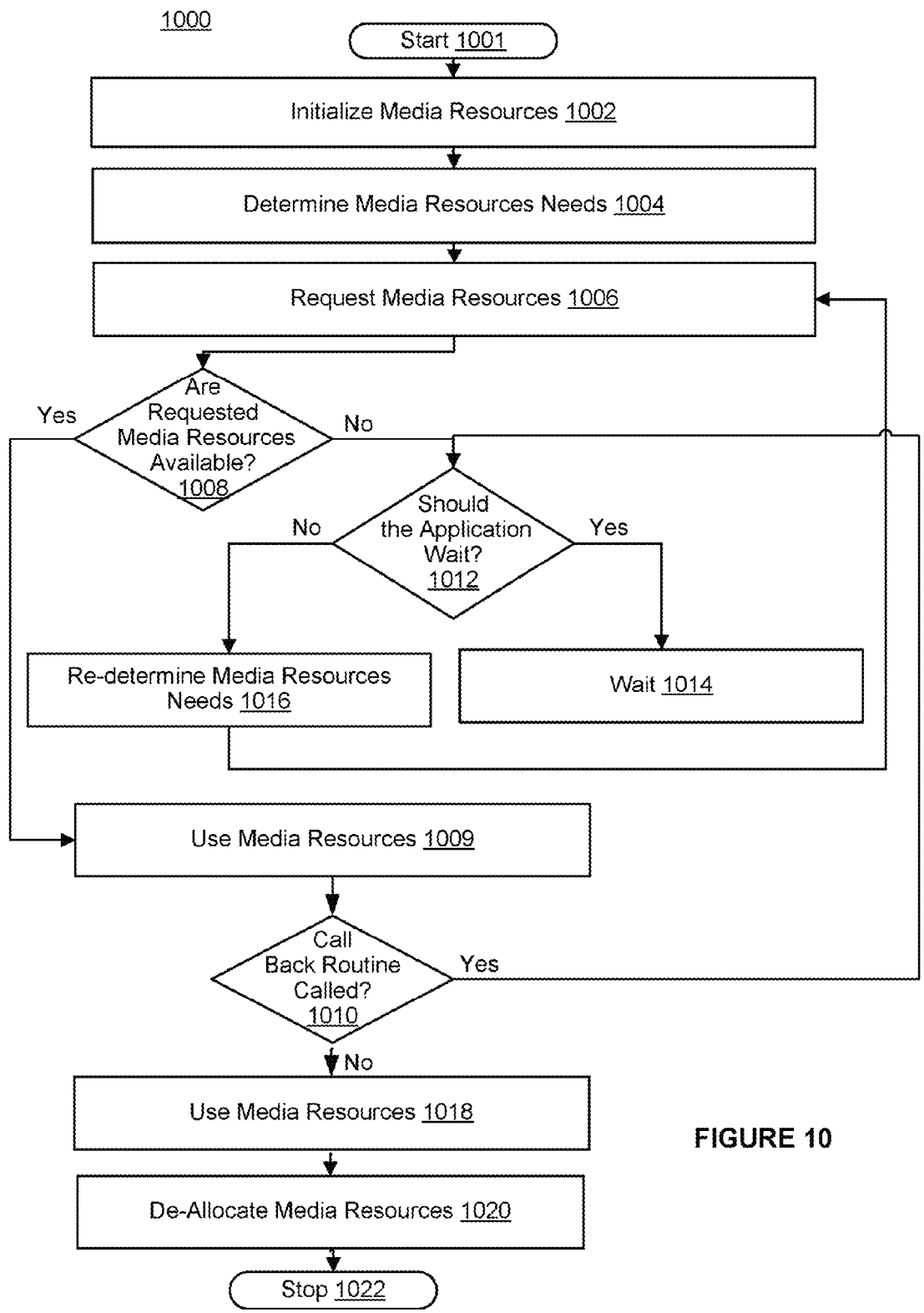
FIG. 10 is a block diagram of an example of a method of an application allocating resources.

FIG. 10 is a block diagram of an example of a method 1000 of an application allocating resources. The method 1000 begins with start (1001). The method 1000 continues with initialize media resources (1002). For example, referring to FIG. 2, the application 208 may call generate media resources allocation table routine 218 to initial media resources. The method 1000 continues with determine media resources needs (1004). For example, the application 208 may make a request for media resources information 250 with media resources requirements 240 to receive a media resources available 256 from the media resources SDK 202. The application 208 may then determine which media resources of the media resources available 256 to request to allocate from the media resources SDK 202. The method 1000 continues with request media resources (1006). For example, the application 208 may send a request for media resources 258 with requested media resources 264 to the media resource SDK 202. The method 1000 continues with are requested media resources available (1008). If the requested media resources are available, then the method 1000 continues with use media resources (1009). For example, the application 208 may be a video application 208 that uses an allocated media resource 230 of decoding MPEG-4 with a GPU. The method 1000 continues with call back routine called (1010). In embodiments, if media resources SDK 202 determines the allocated media resources 230 are needed by another (first) application 208 with a higher priority, then the media resources SDK 202 may de-allocate at least some of the allocated media resources 230. The media resources SDK 202 may then call a call back routine 260 to notify the application 208 that at least some of the allocated media resources 230 have been de-allocated. If the call back routine 260 is called, then the method 1000 continues at 1012, which is discussed below, otherwise the application 208 uses the allocated media resources 230 (1018), and then, in embodiments, the application 208 de-allocates the media resources when the application 208 is finished using the allocated media resources 230 (1020). The method 1000 then stops (1022).

In the method 1000 at 1008, if the requested media resources are not available, then the method 1000 continues to should the application wait (1012). For example, the application 208 may determine whether or not to wait and then re-request the same requested media resources 252. If the application 208, determines to wait, then the method 1000 continues with the application 208 waiting (1014), and then re-requesting the media resources (1006). If the application 208 determines not to wait, the method 1000 continues with re-determine media resource needs (1016). For example, the application 208 may re-determine the requested media resources 252. In embodiments, the application 208 may re-determine the requested media resource 202 based on recommendations in allocated-or-not 264. In embodiments, the application 208 may re-determine the requested media resources 202 based on media resources available 256. For example, the application 208 may determine to use a CPU of the device 100 rather than an already allocated GPU of the device 100. The method 1000 returns to request media resources (1006) after the application 208 has determined which media resources 232 to request.

Figure 11:
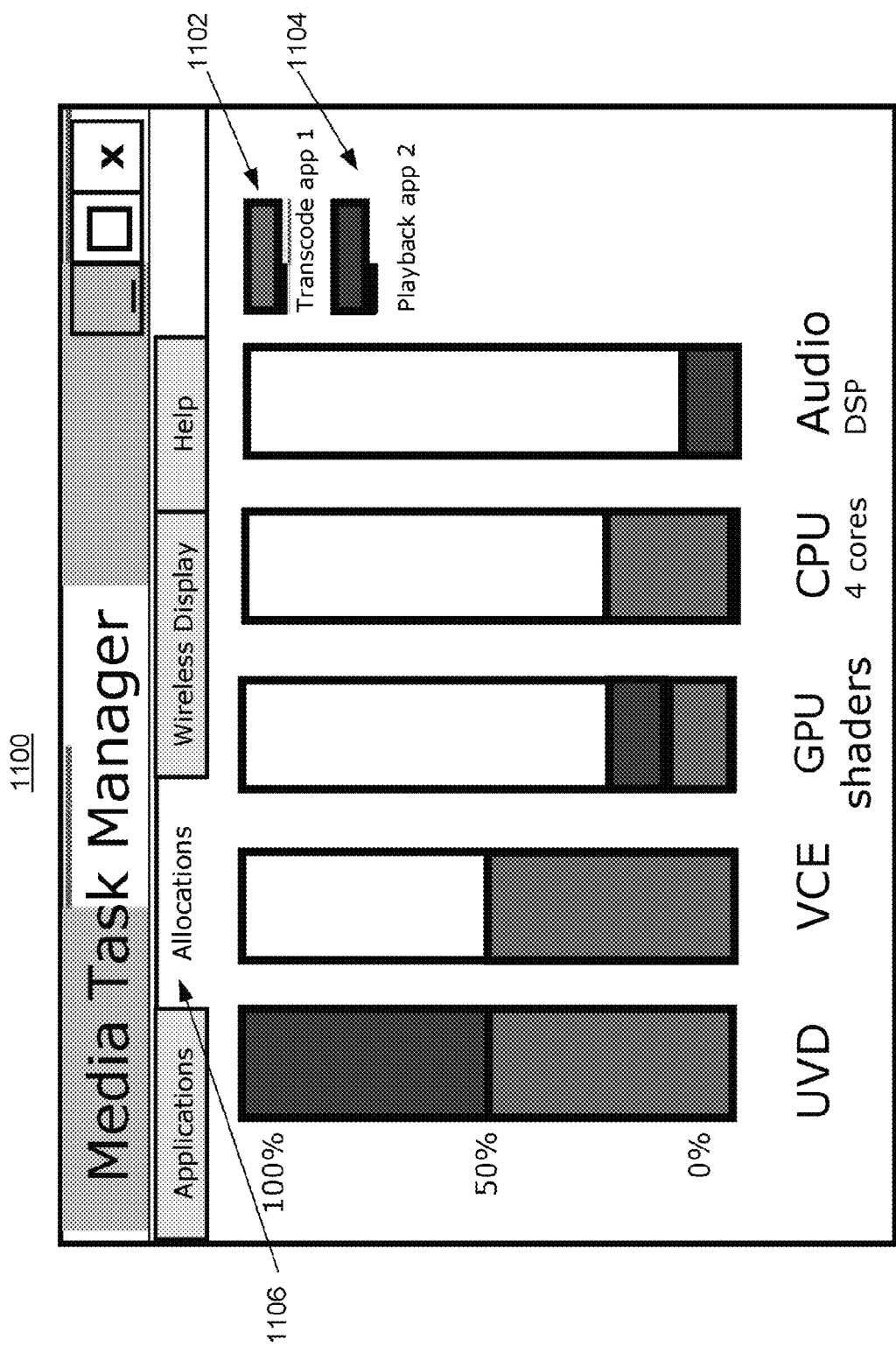
FIG. 11 is a block diagram of an example of a display of the video system resources displayed by a media task manager (MTM) with an allocations tab selected.

FIG. 11 is a block diagram of an example of a display of the video system resources 1100 displayed by a media task manager (MTM) with an allocations tab 1106 selected. The MTM may have four tabs. An applications tab 1106 to illustrate applications that are using or have requested media resource, a tab for allocated media hardware resources, a tab to illustrate wireless display, and a tab for providing help. Other tabs (not illustrated) may include a tab for the number and type of each video task with access to its media resource requirements, and a tab for allocations for a selected media task. As illustrated, in FIG. 11, a first transcode app 1 1102 has allocated to it the following percentages of media hardware resources 206 (see FIG. 2) 50% of UVD, 50% of VCE, about 10% of GPU, about 25% of CPU, and no Audio. A playback app 2 1104 has allocated to it the following percentages of media hardware resources 206 50% of UVD, no VCE, about 10% of GPU, no CPU, and about 10% of Audio.

Figure 12:
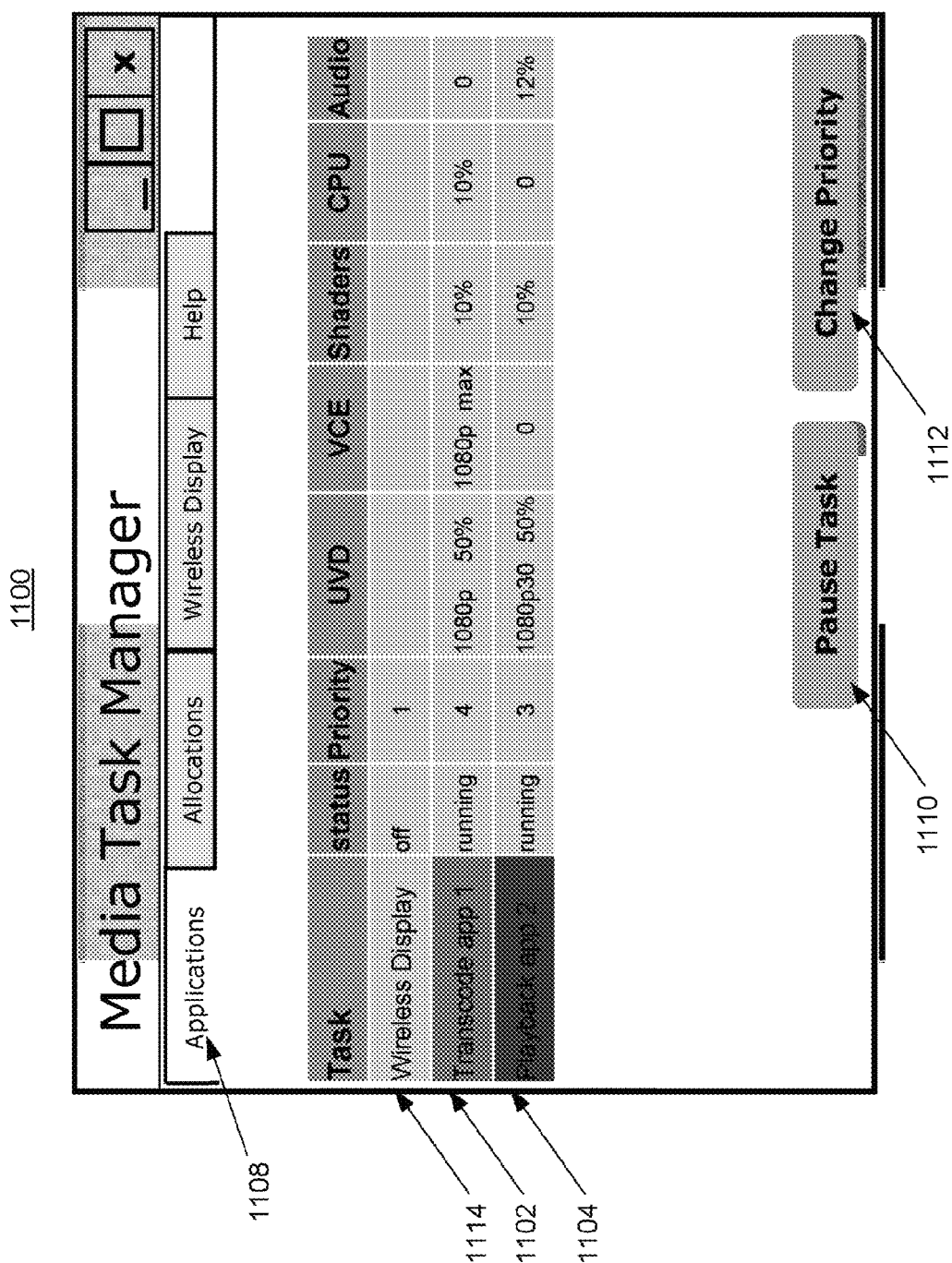
FIG. 12 is a block diagram of an example of a display of the video system resources displayed by a media task manager (MTM) with an applications tab selected.

FIG. 12 is a block diagram of an example of a display of the video system resources 1100 displayed by a media task manager (MTM) with an applications tab 1108 selected. The applications tab view itemizes a list of running tasks and shows the state of the wireless display. The display enables a user to increase or decrease the priority of an application 1114, 1102, 1104 by selecting the "Change Priority" button 1112, and to pause a task by selecting the "Pause Task" button 1110. As illustrated in FIG. 12, transcode app 1102 has a status of running, a priority of 4, UVD of 1080p with 50%, VCE of 1080p with max percent, shaders with 10%, CPU with 10%, and audio with 0%. Playback app 2 1104 has a status of running, a priority of 3, a UVD of 1080p30 with 50%, a VCE of 0, shaders with 10%, CPU with 0%, and audio with 12%. The color of the applications may be consistent with colors representing the application in other tab views.

The following example illustrates the operation of embodiments of the invention, referring to FIG. 2, a transcode application 208 may have allocated media resources 230 associated with media resources 232 UVD and VCE. A second application 208 with a higher priority 244 than the transcode application 208 may make a request for media resources 258 that includes requested media resources 252 associated with media resources 232 UVD and VCE. The media resource allocation routine 224 may call the call back routine 260 of the transcode application 208 indicating that some of its allocated media resources 230 have been de-allocated. The media resource allocation routine 224 may allocate the allocated media resources 230 that were de-allocated to the second application 208 with the higher priority 244. The transcode application 208 may only be able to operate at about half the speed it was operating prior to having some of its allocated media resources 230 de-allocated. Continuing with the example, a user may then turn on a wireless display application 208 with a higher priority 244 than the transcode application 208. The media resource allocation routine 224 may call the call back routine 260 of the transcode application 208 de-allocating any remaining allocated media resources 120. The media resource allocation routine 224 may indicate to the transcode application 208 that it may fall back to using CPU software, wait for media resources 232 to become available, or terminate. The media resource allocation routine 224 may allocate the de-allocated media resources 232 from the transcode application 208 to the wireless display application 208. The wireless display application 208 may then have sufficient media resources 232 to provide a good user experience to the user. This completes this example.

The following example illustrates the operation of embodiments of the invention, referring to FIG. 2, a video conferencing application 208 is running and has allocated media resources 230. A second video conference application 208 is running and has allocated media resources 230. A third video conference application 208 sends a request for media resources 258 to the media resource allocation routine 224, but the response to request for media resources 262 indicates in the allocated-or-not 264 that the requested media resources 252 were not allocated. The third video conference application 208 attempts to do real time streaming with hybrid encoding without using media resources 232, but only the CPU of the device 100 (FIG. 1.) The third video conference application 208 may suffer from performance problems depending on the speed of the CPU.

Embodiments provide the advantage that media applications with high performance needs may be provided with the necessary performance while still permitting other media applications to run on the same device.

Embodiments provide the advantage that media applications may allocate media resources that match their desired power consumption. For example, a user may be able to watch a movie at the lowest possible power consumption to preserve battery power.

Embodiments provide the advantage that media applications such as video teleconferencing may be able to operate with low latency while other media application may still run on the same device.

Embodiments provide the advantage that decoding media such as a movie in order to later re-encode it at a different resolution, different format or different quality level in order to move it to a different playback device, is possible at the fastest possible rate that the encoder can keep up without significantly degrading the performance of applications with a higher priority.

Embodiments provide the advantage that a media application that requires high performance such as capturing the screen contents to encode it and stream it to another device (wirelessly or via a wired network) in order to provide a remote display may be performed with low latency by allocating the necessary media resources so that other media applications do not use the allocated media resources. This media application may enable many uses such as a managed server environment where one personal computer serves multiple users, remote debugging and diagnostics, remote personal computer access, and access to a larger or multiple display or projector.

Embodiments provide the advantage that a media application may be allocated media resources that enable the media application to provide the performance desirable to the user. Different media applications may demand different levels of performance, quality, and power consumption from the underlying hardware and software available on a device, which makes it difficult to provide the performance desirable to the user without allocating the necessary media resources to provide that performance to the media application.

Embodiments provide the advantage that a media application such as a video transcoder, which may request all the media resources, may then have some of the media resources taken back so that another application such as a media application for watching a video with surround sound, video conferencing or wireless display, can run at an acceptable performance to the user.

In embodiments, the routines in media resource SDK 202 are included in a source code of the application 208 and compiled along with the application 208. In embodiments, the routines in media resource SDK 202 are dynamically linked to application 208 at run time.

In embodiments, the media resource allocation table 204 is stored in a shared memory so that more than one application 208 can access the media resource allocation table 204. In embodiments, the media resource allocation table 204 is stored in CA3 data space of AMD® video cards.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. In embodiments, the computer-readable storage medium does not include transitory signals. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of allocating media resources on a device, comprising:
   determining a media resources allocation table based on one or more media resources, the one or more media resources being determined based on media hardware resources on the device, a power consumption of each hardware resource, and predetermined benchmarks of the media hardware resources for performing media operations;
   adjusting the media resources allocation table based on actual clock speeds determined for the device while it is running the one or more media resources by running test routines on the device and comparing the actual clock speeds of the device to an estimated clock speed of the device;
   receiving a request for media resources from a first application, wherein the request for media resources includes requested media resources, requested performance and a requested power consumption;
   in response to receiving the request, comparing the requested media resources with the media resources allocation table based on the requested performance and the requested power consumption to generate a comparison result;
   when the comparison result indicates that the requested media resources satisfies the requested performance and the requested power consumption:
      allocating the requested media resources to the first application, and
      sending a response to the request for media resources to the first application indicating the requested media resources are allocated to the application; and
   when the comparison result indicates that the requested media resources are not available;
      determining a different media resource to allocate that does satisfy the requested performance and the requested power consumption.

2. The method of allocating media resources of claim 1, further comprising:
   when the comparison indicates that a second application having a priority lower than a priority of the first application is allocated media resources needed to satisfy the request for media resources, then allocating at least some of the media resources from the second application to the first application in the media resources allocation table, and calling a call back routine of the second application indicating to the second application that at least some of the media resources allocated to the second application have been de-allocated, and sending a response to the request for media resources to the first application indicating the requested media resources are allocated to the first application.

3. The method of allocating media resources of claim 1, wherein the media resources comprise at least one of a decode capacity, an encode capacity, and a scaling/color space conversion (CSC) operation capacity.

4. The method of allocating media resources of claim 1, wherein hardware media resources comprise one or more graphic processing units, and one or more device central processing unit (CPU).

5. The method of allocating media resources of claim 1, further comprising:
   in response to receiving a request to initiate a media resource allocation system, generating the media resources allocation table.

6. A device for allocating media resources, the device comprising:
   one or more processors; and
   a memory communicatively coupled to the one or more processors:
   wherein the one or more processors:
   determine a media resources allocation table based on one or more media resources, the one or more media resources being determined based on media hardware resources, a power consumption of each hardware resource and predetermined benchmarks of the media hardware resources for performing media operations;
   adjust the media resources allocation table based on actual clock speeds determined for the device while it is running the one or more media resources by running test routines on the device and comparing the actual clock speeds of the device to an estimated clock speed of the device;
   receive a request for media resources from a first application, wherein the request for media resources includes requested media resources, requested performance and a requested power consumption;
   in response to receiving the request, compares the requested media resources with the media resources allocation table based on the requested performance and the requested power consumption to generate a comparison result;
   when the comparison result indicates that the requested media resources satisfies the requested performance and the requested power consumption:
      allocate the requested media resources to the first application, and
      send a response to the request for media resources to the first application indicating the requested media resources are allocated to the first application, when the comparison indicates that the requested media resources are available; and when the comparison result indicates that the requested media resources satisfies the requested performance and the requested power consumption:

determine a different media resource to allocate that does satisfy the requested performance and the requested power consumption.

7. The device for allocating media resources of claim 6, wherein the one or more processors further:

allocate at least some of the media resources from a second application to the first application in the media resources allocation table, and call a call back routine of the second application indicating to the second application that at least some of the media resources allocated to the second application have been de-allocated, and send a response to the request for media resources to the first application indicating the requested media resources are allocated to the first application, when the comparison indicates that the second application has a priority lower than a priority of the first application and that the second application is allocated media resources needed to satisfy the request for media resources of the first application.

8. The device for allocating media resources of claim 6, wherein the media resources comprise at least one of a decode capacity, an encode capacity, and a scaling/color space conversion (CSC) operation capacity.

9. The device for allocating media resources of claim 6, wherein hardware media resources comprise one or more graphic processing units, and one or more device central processing unit (CPU).

10. The device for allocating media resources of claim 6, wherein the one or more processor further:

respond to receiving a request to initiate a media resource allocation system, by generating the media resources allocation table.

11. A computer readable non-transitory medium including instructions which when executed in a processing system cause the processing system to execute a method for allocating media resources, the method comprising the steps of:

determining a media resources allocation table based on one or more media resources, the one or more media resources being determined based on media hardware resources on a device, a power consumption of each hardware resource, and predetermined benchmarks of the media hardware resources for performing media operations;

adjusting the media resources allocation table based on actual clock speeds determined for the device while it is running the one or more media resources by running test routines on the device and comparing the actual clock speeds of the device to an estimated clock speed of the device;

receiving a request for media resources from a first application, wherein the request for media resources includes requested media resources, requested performance and a requested power consumption;

in response to receiving the request, comparing the requested media resources with the media resources allocation table based on the requested performance and the requested power consumption to generate a comparison result;

when the comparison result indicates that the requested media resources satisfies the requested performance and the requested power consumption:

allocating the requested media resources to the first application, and sending a response to the request for media resources to the first application indicating the requested media resources are allocated to the application; and when the comparison result indicates that the requested media resources are not available:

determining a different media resource to allocate that does satisfy the requested performance and the requested power consumption, and sending a recommendation for the different media resource.

* * * * *